Z. ECKELBARGER.
PISTON AND PACKING RING.
APPLICATION FILED APR. 17, 1919.
1,320,210.
Patented Oct. 28, 1919.
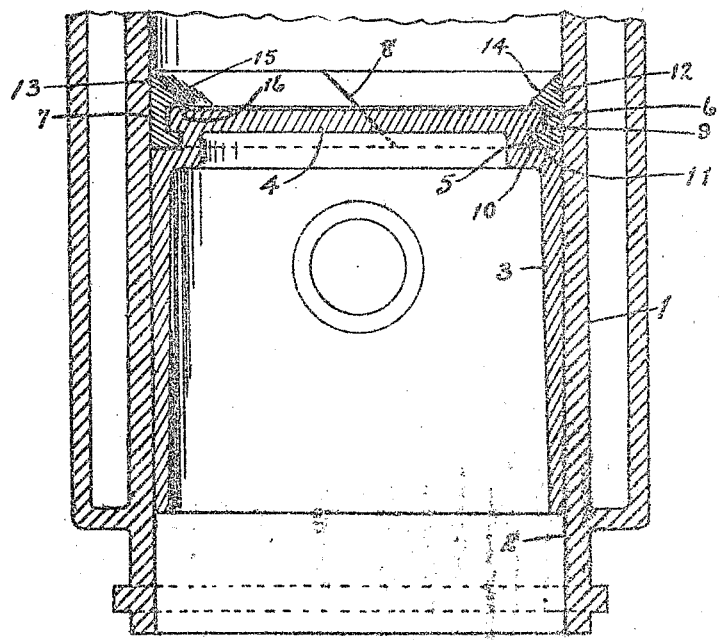
INVENTOR
Zena Eckelbarger
By Louis C. Vanderlip
atty.

UNITED STATES PATENT OFFICE.

ZENA ECKELBARGER, OF GOSHEN, INDIANA.

PISTON AND PACKING-RING.

1,320,210.

Specification of Letters Patent.

Patented Oct. 28, 1919.

Application filed April 17, 1918. Serial No. 228,999.

*To all whom it may concern:*

Be it known that I, ZENA ECKELBARGER, a citizen of the United States, residing at Goshen, county of Elkhart, State of Indiana, have invented certain new and useful Improvements in Pistons and Packing-Rings, of which the following is a specification.

This invention relates to pistons and packing rings, and more especially to pistons and packing rings for use in internal combustion engines, and to improvements in such devices.

An object of my invention is the production of a piston and packing ring, more especially the latter, for internal combustion engines which becomes very effective as a packing member on the working stroke of the piston due to the pressure of the expanding gases thereon. Another object is the production of a packing ring which exerts a relatively light pressure on the cylinder wall during all the piston movements except the working stroke thereof. Still another object of my invention is the production of a packing ring having means for effecting a seal on the piston head to preserve the compression on the compression stroke and to prevent leakage past the ring and through its groove during the working stroke of the piston. Yet another object is the provision of means on a packing ring to exclude carbon from the packing ring groove. Other objects are mentioned and described herein.

The preferred embodiment of my invention is well illustrated in the accompanying drawing in which the figure disclosed is a section taken through an engine cylinder, piston, and my improved packing ring mounted in the piston. Similar numerals of reference indicate like members and parts of members thereon.

Referring to the drawing in detail, the numeral 1 indicates an engine cylinder of the conventional or any type having a bore 2 within which the cylindrical piston 3 is arranged for reciprocation. The piston 3 is provided with the head 4 and the annular endless packing ring groove 5 encircling the outer periphery of the piston body adjacent the top end thereof, the upper wall whereof is formed by the annular shoulder or flange 6 which lies substantially in the same plane with the piston head 4 the outer or circumferential periphery of said flange being spaced substantially from the cylinder bore.

The numeral 7 indicates an annular packing ring of the expansible type and split at 8 to enable expansion thereof, as is usual in packing rings. The ring 7 may be made of any suitable metal but is preferably made of cast iron of a mixture most suitable for the particular art. The ring 7 is provided with an annular groove 9 on its inner periphery within which groove the annular flange 6 is arranged with slight play. The lower wall of the ring groove 9 consists of an annular inwardly projecting flange 10 which is arranged within the groove 5 with slight play, the bottom periphery of said flange being slightly spaced from the annular floor 11, of the piston body, which forms a part of the groove 5, and an outward extension thereof.

The ring 7 is provided and formed with an annular upward extension 12 which is projected above the upper periphery of the piston head 4, said extension being formed with a cylindrical exterior 13 which accurately conforms to the cylinder bore and slides thereon. The extension 12 is provided also with a sloping or inclined inner wall 14 extending from a relatively sharp edge at the top of the extension portion inwardly or centrally of the combustion chamber of the cylinder, the lower extremity of said inclination forming the upper wall 15 of the ring groove 9.

The numeral 16 indicates an annular packing ring seat formed on the upper surface of the flange 6 and upon which the wall 15 of the ring 7 is adapted to seat to form a seal, said seat being finished or machined to give a uniform contact of the members, both of which are machined for that purpose. The ring 7 is constructed to normally exert less expansive force against the cylinder wall than the ordinary split packing ring and, except when the pressure of the expanding or compressed gases is working on the inclined wall 14 and expand it, the ring engages the wall of the cylinder bore lightly, thereby causing the minimum friction thereon which is substantially less than that exerted by the ordinary packing ring.

In operation, the seat 16 seals against both leakage of compression and gas expansion past the ring interior and through the groove 9 thereof as well as effectually preventing carbon accumulation within said groove and elsewhere either on the ring surface or within the groove 5.

I claim:

1. A piston comprising a cylindrical body portion having a head, said head having an annular circumferential flange thereon and a finished seat on the upper periphery of said flange adjacent the outer edge thereof, said flange being of substantially less diameter than the piston body; and an annular one piece split expansible packing ring the inner periphery whereof is provided with an endless circumferential groove which is engaged by said piston head flange, the upper wall of said groove being arranged upon said seat and finished to correspond with the finish thereof, said ring extending upward above said head flange, the inner wall of said extension being inclined downwardly and inwardly relative to the outer edge thereof and terminating adjacent the inner edge of the upper wall of said ring groove, said extension inclination being adapted, when subjected to pressure from above, to expand said ring and to effect a seal between the upper wall of said ring groove and said piston head seat.

2. A piston comprising a body portion having a head, said head having an annular circumferential flange thereon and a seat on the upper periphery of said flange, said flange being of less diameter than the piston body; and a one piece split expansible annular packing ring the inner periphery whereof is provided with a groove which is engaged by the piston head flange the upper wall of said groove being arranged upon said seat to effect a seal, said ring extending upward above said flange the inner wall of said ring extension being inclined relative to the outer wall thereof and terminating adjacent the inner edge of the upper wall of said packing ring groove.

In testimony whereof I have hereunto affixed my signature this 9th day of April, 1918.

ZENA ECKELBARGER.